United States Patent [19]

Sundberg

[11] 4,276,359
[45] Jun. 30, 1981

[54] LEAD-ACID BATTERY WITH TUBULAR PLATE ELECTRODE

[75] Inventor: Erik Sundberg, Newtown Crossing, Pa.

[73] Assignee: Koehler Manufacturing Company, Marlborough, Mass.

[21] Appl. No.: 42,632

[22] Filed: May 25, 1979

[30] Foreign Application Priority Data

Sep. 1, 1978 [SE] Sweden .................................. 7809214

[51] Int. Cl.³ ............................................. H01M 2/18
[52] U.S. Cl. .................................................... 429/140
[58] Field of Search ................................. 429/140, 141

[56] References Cited

U.S. PATENT DOCUMENTS

| | | | |
|---|---|---|---|
| 1,479,527 | 1/1924 | Wilson | 429/140 |
| 2,715,651 | 8/1955 | Ardena | 429/140 |
| 2,985,701 | 5/1961 | Brennan | 429/140 |
| 3,207,632 | 9/1965 | Bickover et al. | 429/140 |

FOREIGN PATENT DOCUMENTS

| | | | |
|---|---|---|---|
| 546823 | 3/1953 | Canada | 429/140 |
| 1268238 | 3/1972 | United Kingdom | 429/141 |

*Primary Examiner*—Donald L. Walton
*Attorney, Agent, or Firm*—Burns, Doane, Swecker & Mathis

[57] ABSTRACT

A tubular plate for electrical lead acid accumulators comprises tubes formed of porous fibrous material having a shape such that the ratio of volume to surface area of active material is no greater than 0.20 times the thickness of the tube taken in a direction between the sides of the plate which face the negative electrodes. At least one side of each tube has a concave surface. The tubes are formed with integral rigid flanges formed by weld joints between the tubes. The flanges support the tubes and aid in shaping of the tubes.

2 Claims, 18 Drawing Figures

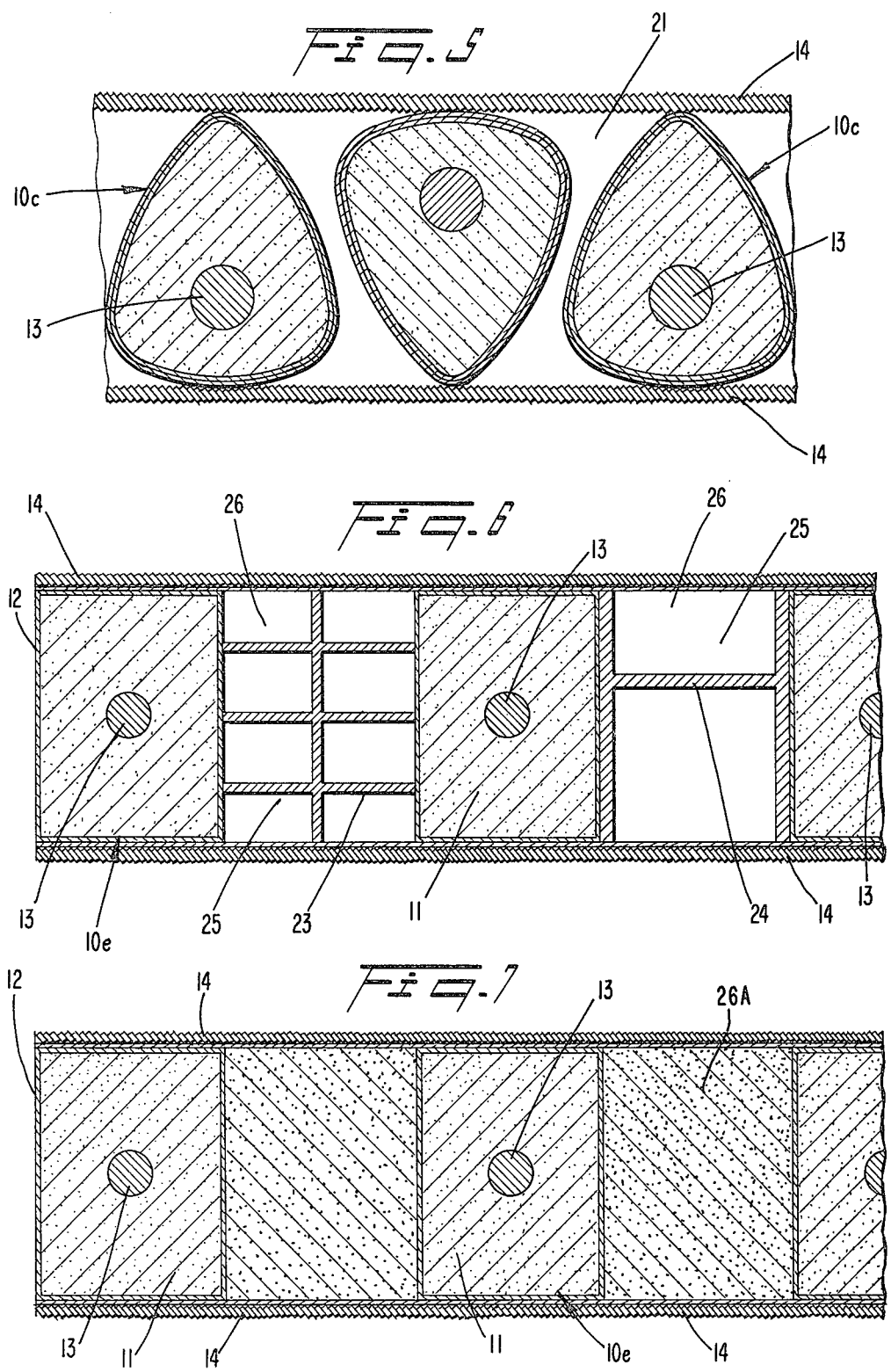

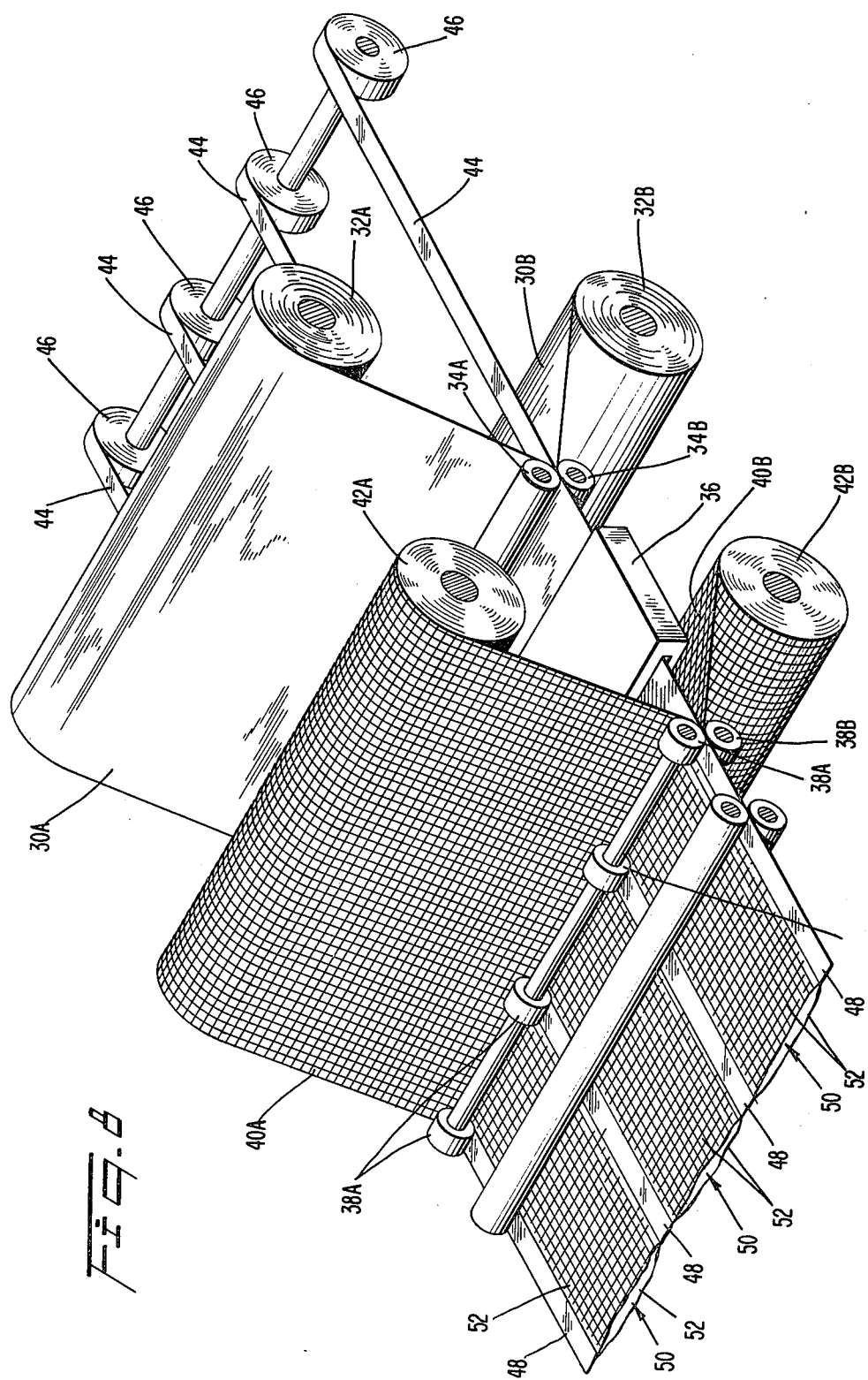

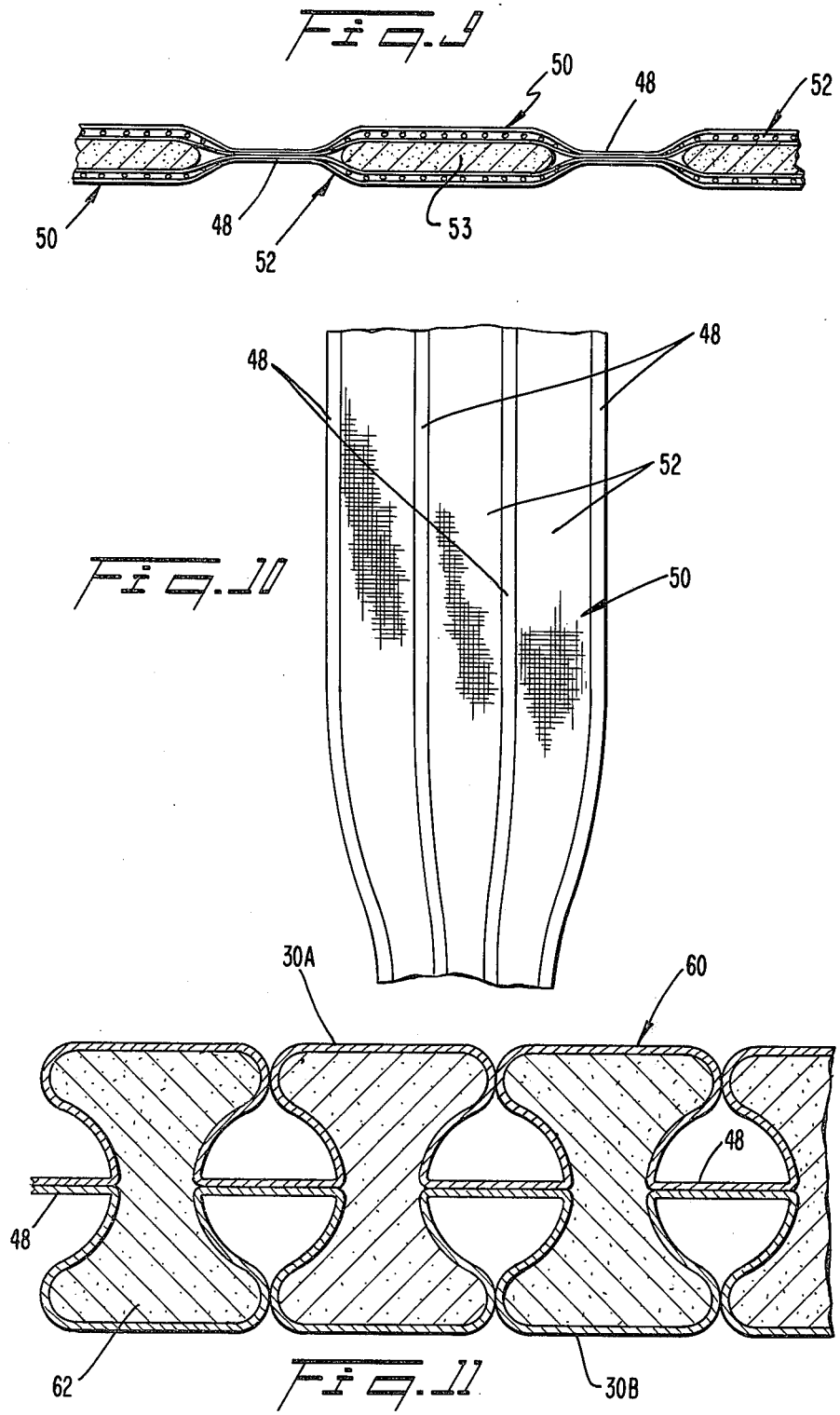

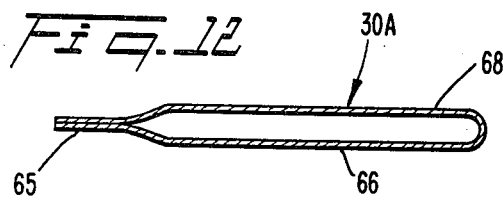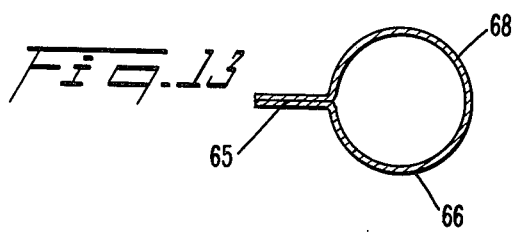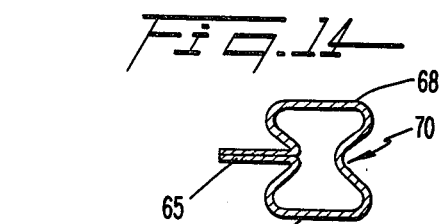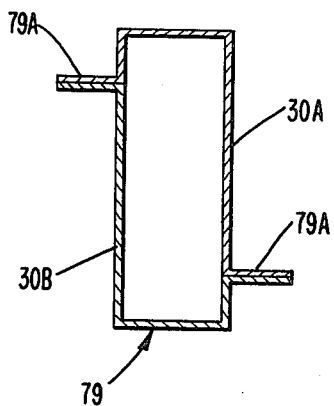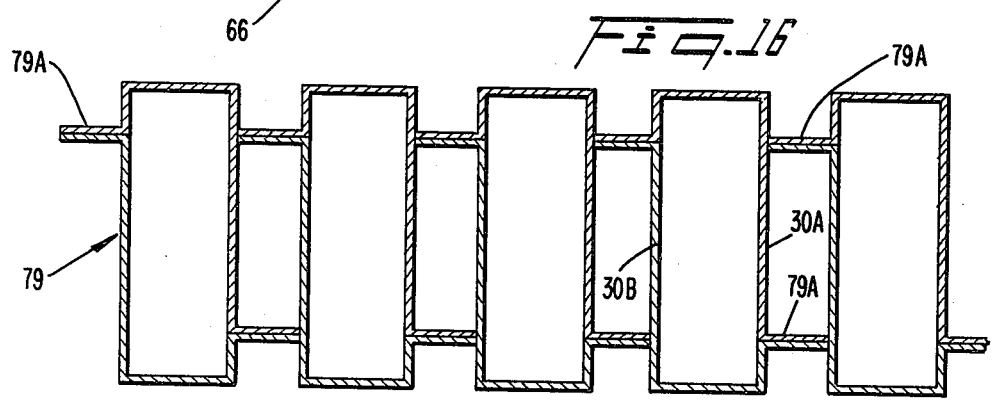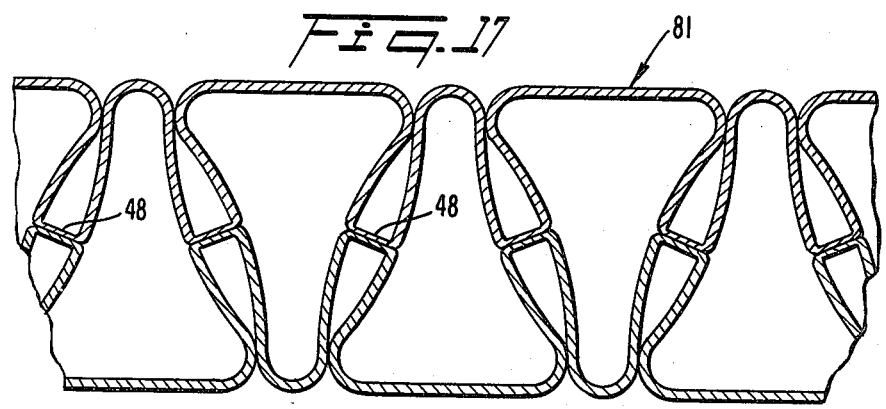

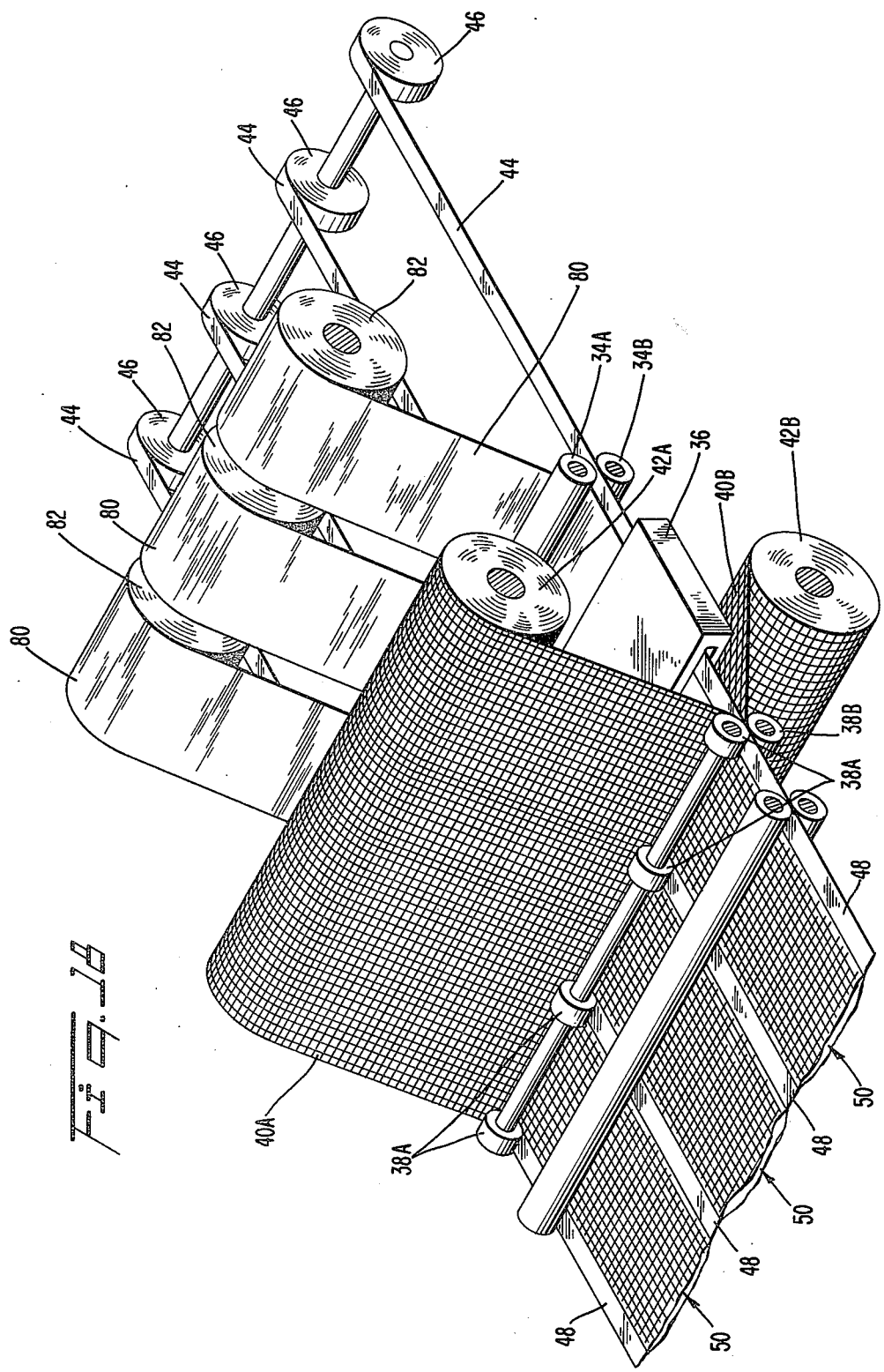

LEAD-ACID BATTERY WITH TUBULAR PLATE ELECTRODE

BACKGROUND AND OBJECTS OF THE INVENTION

The invention concerns lead-acid batteries and, more specifically, the design of the positive electrodes in such batteries.

Lead-acid batteries typically comprise positive and negative electrode plates separated by microporous separators, with sulfuric acid serving as an electrolyte. During discharge, as many sulfate ions are used at the positive electrode as at the negative electrode. However, at the positive electrode water is generated and the porosity decreases more than at the negative electrode, i.e., less surface area of the positive electrode is available to admit sulfuric acid. Problems at the negative electrode are minimized by the fact that the sulfate ions have a potential which urges them toward the negative electrode.

The availability of sulfuric acid at the positive electrode is further limited by the fact that acid transport in the microporous separator is difficult, and thus the travel of acid to the positive electrode is resisted.

In order to attempt to compensate for the limited availability of sulfuric acid at the positive electrode, the separators have heretofore been provided with ribs facing the positive electrode, which ribs define channels or pockets for confining sulfuric acid. Hence, access of the acid to the positive electrode is somewhat improved.

In spite of this arrangement, the capacity of the cell continues to be limited by the positive electrode due to the restricted access of acid to the positive active material.

To increase capacity, the positive electrode can be made thinner and more porous, thereby facilitating travel of the acid thereto. The use of thinner plates, however, requires more electrodes and separators to maintain capacity and thus involves higher costs and also thinner current collectors with higher corrosion and shorter life as a result. The higher porosity also decreases the life of the cell due to rapid loss of active material from the positive electrode.

Those problems are complicated by the fact that the life of the positive electrode is a function of the loss in volume of the active material. In high quality batteries, such as industrial batteries, for example, porous material such as glasswool is used to support the surface of the positive electrode during regular discharge to help retain the volume thereof. Such material, however, further decreases the rate of acid transport. In certain designs, the ribs on the separators are replaced with thicker or thinner layers of porous material such as glasswool.

One design of a positive electrode heretofore proposed to support the active material and improve the life span of the positive electrode involves a so-called tubular plate comprising a number of parallel tubes. Each tube comprises a current collector imbedded within and contacting the active material. The collectors are joined together by a bar at the top. If the tubes in such a tubular plate are made of a material such as woven or braided glass which can withstand the pressure occurring during discharge, it is possible to get very small volume changes and thus obtain a good life span for the tubular plate.

Tubes have been proposed which in one case are of circular shape and, in another case are of square shape. A plurality of mutually contacting circular tubes offers increased surface area and thus increased porosity (see Swiss Pat. No. 199,710 published Nov. 16, 1965). The small area between adjacent tubes contains acid which penetrates the positive active material. However, such a design of a positive electrode results in an increased ratio of volume to surface area which can be disadvantageous. Moreover, the small space between the round tubes is insufficient to adequately supply the positive electrode, thereby requiring the use of reservoir-defining ribs on the separator.

Even if round tubes are spaced apart so as to provide additional space therebetween, the capacity of the cell can only be maintained by adding additional plates and separators in lieu of the ribs, but this significantly increases the cost of the accumulator.

As mentioned above, square-shaped tubes have been proposed in order to increase the surface area of the tubular plate and thereby facilitate the penetration of acid into the positive active material. There exists between the square tubes a slight incidental spacing of about 1 mm, whereby a minimal amount of acid can become situated between the tubes. Ribbed spacers are still required, however, to provide acid for the positive electrode.

Moreover, as the active material in the electrodes swells during discharge, there occurs a pressure in the tubes which the square shape cannot withstand, with the result that the walls of the tubes expand and contact each other, even after perhaps only some ten discharges. Since a high quality accumulator shall have a life of 1000–2500 discharges, there will be almost no free acid between the tubes in such design; but rather will be in the pores of the walls and electrode and between the positive and negative plate and at the side of and under the plate group.

It has also been suggested to provide tubes with somewhat concave side surfaces which define electrolyte channels therebetween (see German Pat. No. 961,720). The tubes are formed of plastic and include horizontal slots for admitting electrolyte. However, the capacity of the accumulator is very limited since contact between electrolyte and active material is possible only by means of the spaced slots.

As noted earlier, it is desirable to minimize the ratio of volume-to-surface area of the positive electrode tube. For a square or circular tube, such a ratio is 0.25 d, where d is the diameter of a circular tube or a side dimension of a square tube. Thus, it would be desirable to provide a positive electrode tube whose ratio of volume to surface area is less than 0.25 d while maximizing or maintaining the capacity of the electrode.

Presently used tubes exhibit very limited outer support, making it necessary to form them of strong material-like braided or woven continuous fibers to enable the tubes to withstand the pressure developed therewithin. It would be desirable to eliminate such an expensive tube construction.

When a lead acid battery is charged following a discharge, oxygen begins to develop when only 80–90% of the battery is charged, whereas hydrogen does not evolve until after 98–100% of the previous discharge. It has been found that if the positive and negative electrodes can be pressed together with only a thin hydrous separator between them, the evolving oxygen will be forced through the separator into the negative plate. If the negative plate is oxydized in this way, the battery can be fully charged till 100% without any gas evolution at all. Such sealed, high-pressure batteries have recently been commercialized. However, as recombination is related to the pressure between plates and the thickness of the separator, such batteries are starved for electrolyte which are available only in the pores of the plate or in the thin separator. It would be desirable to enable the pressure to be maintained within such batteries while providing ample electrolyte to the plates.

It is, therefore, an object of the present invention to minimize or obviate problems of the type noted above.

It is another object of the present invention to provide an electrical accumulator having increased capacity and unchanged volume.

It is a further object of the invention to provide an electrical accumulator in which the spacing between the positive and negative active material is effectively minimized.

One further object of the invention is by outer support of the tubes to be able to use very inexpensive material for the tube walls and in this way considerably reduce the cost of the tubes.

It is a further object of the invention to provide an electrical accumulator of the sealed, pressurized type wherein adequate pressure is maintained and an ample electrolyte supply is provided.

It is still a further object of the invention to provide a positive electrode tube having a minimized ratio of volume-to-surface area.

It is an additional object of the invention to provide a novel method for fabricating electrode tubes of minimized volume-to-surface area ratio and maximized support between tubes.

BRIEF SUMMARY OF THE INVENTION

The objects of the present invention are achieved in an electrical lead-acid accumulator having negative plates and positive plates, the latter each comprising a plurality of spines of conducting material arranged at a distance from each other, each being imbedded in active material and in contact therewith. The active material is contained within tubes formed of porous fibrous material whose shape defines a ratio of volume-to-surface area which is no greater than 0.20 d, where d is maximum dimension of the tube in a direction extending between the positive and negative plates. This is achieved in one embodiment of the invention by shaping at least one side of the electrode tube in a concave manner. Preferably, the tube is concave at both sides and most preferably in the manner of an I-beam. The dimension of the positive electrode plate can be greater in one direction extending between the positive and negative plates and thereby occupy space heretofore occupied by the large ribs of spacers, since the electrolyte formerly contained by such ribs is situated between the electrode tubes in accordance with the present invention. Accordingly, the distance between the positive active material and the negative plates is reduced, thereby facilitating discharge. The tubes may be supported by stiff flanges extending therebetween, which flanges are defined by an integral portion of one or both of the tubes. This can be achieved by simultaneously forming a plurality of interconnected tubes, with joints between the tubes being stiff to define rigid reinforcing flanges. Alternatively, the tubes can be formed individually, with rigid flanges projecting outwardly therefrom for connection to another tube.

In accordance with the present invention the plates can be assembled with pressure between them so that if a suitable thin separator, like a microporous fiber-glass separator, the oxygen will be forced through the separator to the negative plate and react and oxydize the active material. In this way, the negative will be kept in a less-than-fully charge condition and not evolve any higher.

THE DRAWING

These and other objects and advantages of the invention will become apparent from the following detailed description of a preferred embodiment thereof, in connection with the accompanying drawings in which like numerals designate like elements, and in which:

FIGS. 5–7 are views similar to FIG. 2 of still other preferred tube shapes;

FIG. 8 is a schematic perspective view of apparatus for fabricating electrode tubes according to the present invention;

FIG. 9 is a cross-sectional view through a continuous type of tubing during the manufacturing process;

FIG. 10 is a plan schematic view depicting the manner in which the width of the continuous tubing diminishes as the channels of the tube are formed to the desired shape;

FIG. 11 is a cross-sectional view through a tubular electrode plate in accordance with one embodiment of the invention;

FIG. 12 is a cross-sectional view through a single tube being fabricated in accordance with the present invention;

FIGS. 13 and 14 are views of the tube according to FIG. 12 in final shapes, respectively;

FIG. 15 is a cross-sectional view of another preferred type of individual tube according to the present invention;

FIG. 16 is a cross-sectional view of a continuous tubing formed of a plurality of interconnected tubes depicted in FIG. 15;

FIG. 17 is a cross-sectional view through still another embodiment of continuous tubing according to the present invention; and FIG. 18 is a view similar to FIG. 1 of another form of apparatus for fabricating electrode tubes according to the present invention.

DETAILED DESCRIPTION OF PREFERRED EMBODIMENTS OF THE INVENTION

Figure 1:
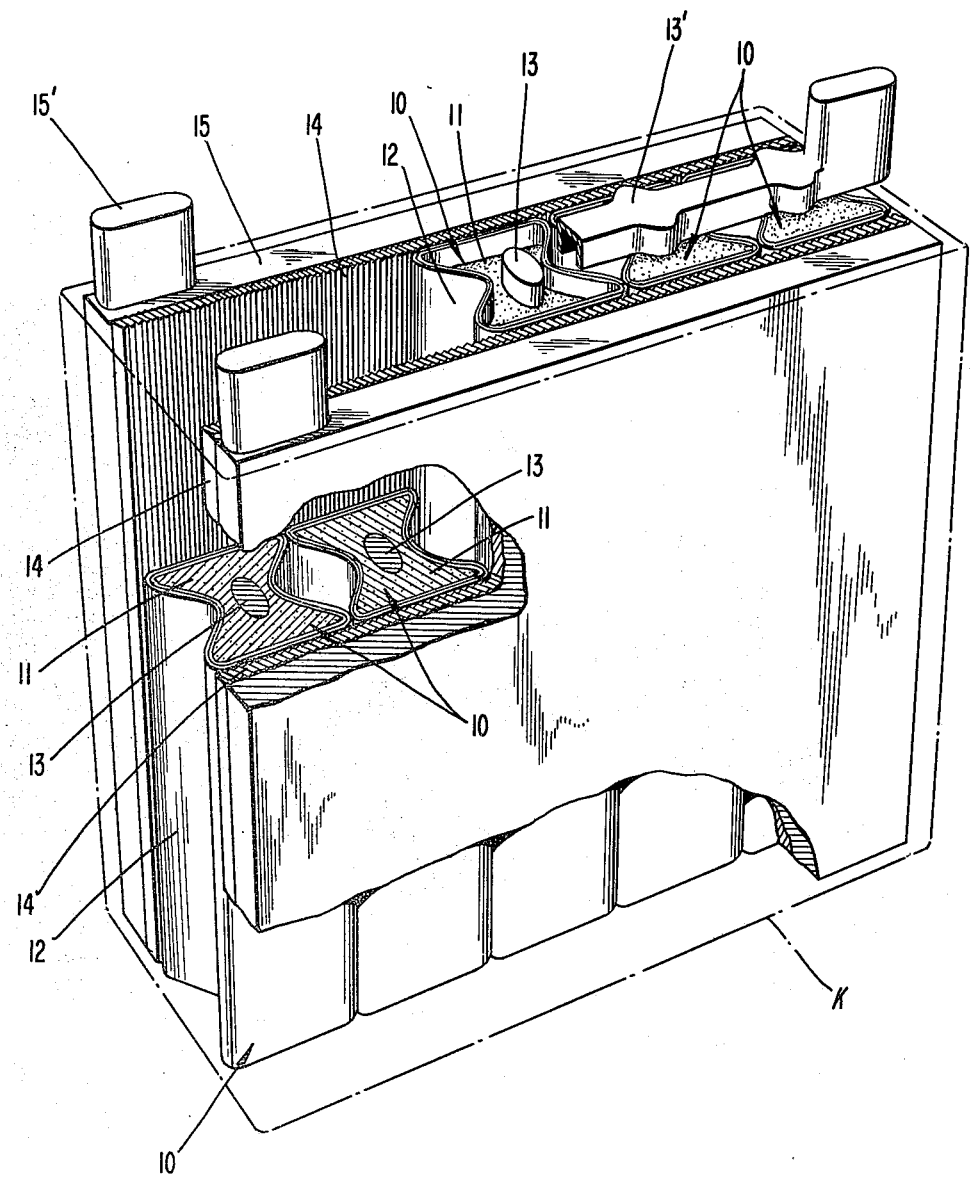
FIG. 1 is a perspective view of an electrical accumulator according to the invention.

An electrical accumulator according to the present invention includes a positive tubular electrode plate having I-shaped tubes 10 containing positive active material 11 (FIG. 1). The plate comprises a tubular sheath 12 formed of fibrous material which is resistant to acid and to reactions in the accumulator. The tubes may comprise an inner wall of braided or woven glass fiber and an outer wall of thin perforated plastic film, as will be discussed in more detail below in connection with FIGS. 8–18. Within each tube is disposed an electric current collecting spine 13 in contact with the active material. On each side of the tubes there are disposed thin, essentially flat separators 14 having fine serrations or teeth on both sides. One side of the separator 14 bears against the tubes 10 and the other side bears against a negative plate 15 in the cell. Each of the negative plates includes a bar with a lug 15'. The spines 13 of the positive plate are connected to a top bar 13' having a lug. The plate group is placed in a cell container K for the acid, as is conventional.

Figure 2:
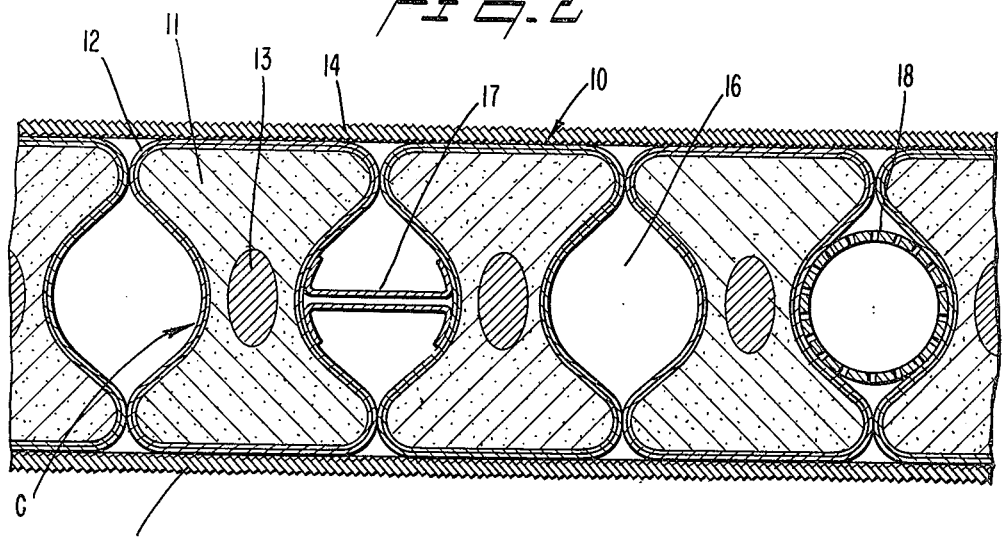
FIG. 2 is a fragmentary plan view of a plate group (positive active material and separators) in a larger scale than in FIG. 1, and illustrating a first preferred tube shape.

According to the present invention, the tubes 10 are of a shape which minimizes the ratio of volume-to-surface area (i.e., V/A). Various possible shapes for accomplishing these are depicted in FIGS. 2, 4 (I-shape), FIG. 3 (T-shape), FIG. 5 (egg-shape) and FIGS. 6–7 (non-square rectangular shape). It will be realized that in each case, the largest dimension d of the tube in the direction extending between the positive and negative plates is greater than the minimum dimension e in a direction normal to the above-defined direction (see FIG. 4). By virtue of such shape, the V/A ratio can be held at no greater than 0.2 d. By comparison, the V/A ratio for a square or circular shaped tube is 0.25 d.

The preferred manner of achieving the minimized V/A ratio is by providing the tube with a generally concave surface C at one or both sides, as per the I-shape illustrated in FIGS. 2, 4 for example. The larger surface area defined by the concave surfaces C also provide a better utilization of positive active material and acid.

The I-shaped tubes are placed tight against each other forming a space 16 therebetween. The total surface for a tube with this I-profile, however, still has a shape which can withstand pressure. The concave surfaces forming the space 16 form arches, and by using proper plastic perforated film like polyester (Mylar) or PVC, it is possible to attain enough strength to withstand the pressure usually encountered. For other tubes, and/or to further increase the ability of the tubes to withstand pressure, supports 17 can be arranged in the space 16 between mutually facing tubes (see FIG. 2). This support can be made of polyester or PVC and can comprise the very joint of the plastic when the tubes are fused from the plastic film as will be discussed below. Impregnated tubes of the type Cladex or PgS should have a supporting tube 18 of perforated plastic film or porous material. With all the tubes thus supported, it is possible to employ a relatively weak, inexpensive wall for the tubes such as a non-woven mat. If a glass retainer mat is used, this can be reinforced by an inexpensive plastic mat.

A preferred method of providing tubular plates having supports is described below in connection with FIGS. 8–18.

The jar K extends high enough for acid to travel over the top of the electrode. By means of the space 16, which is open at the top (and preferably also at the bottom), the acid which lies above the plates has free access to the positive electrodes; and the dilution of the acid decreases, resulting in better output. The spaces 16 thus form acid reservoirs and also make it easier for the acid from the top to reach the positive active material. The sulfate ions located within the reservoirs 16 have a potential forcing them toward the negative plates and thus, they will pass through parts of the positive active material in the process. The potential thus promotes entry of the sulfate ions into the positive active material. Since the sheath is fibrous, it is porous to the electrolyte essentially from the top to the bottom of each tube, thereby utilizing the entire column of electrolyte within the reservoir 16 and thus maximizing contact thereof with the active material.

The reservoirs 16 are sized such that the total amount of electrolyte contained within the reservoirs 16 is at least 10% of the total electrolyte within the accumulator.

In the embodiment of FIG. 2, the spines 13 are elliptical and there occurs a certain "tip effect" where the positive active material is the thickest. As the acid diffusion to the spines is easier in this example and corrosion often is caused by too high pH, the corrosion will be less here than in conventional batteries.

The separators 14 are thin and fine ribbed on both sides with a maximum thickness of 0.8–1.0 mm. In this way the distance between the positive and negative electrodes will be minimized, resulting in lower internal resistance. For example as depicted in FIG. 4, the center of mass M of the positive active material of one-half of the tube is spaced closer to the negative electrode by a distance R from the geometrical centerline L of that active material. It will be appreciated that the separators 14 provide substantial support for the positive electrode plate, contrary to a conventional reservoir-defining large-ribbed separator wherein only one rib thereof might contact a given tube. Numerous ones, i.e., at least ten of the teeth of the separator 14 according to the present invention are in contact with each tube. Even in cases where sides of the tubes facing the separators are narrow, e.g., see FIGS. 3 and 5, at least two teeth contact such narrow side. At least 50% of each tube side facing the separator can be supported, in accordance with the present invention.

The separators 14 and the negative electrodes 15 withstand the pressure in the tubes caused by discharge, thus resulting in good life to both the positive and negative electrodes.

An advantage of the present invention is the minimizing of corrosion of the spines 13. In the present invention, the distance from the tubewall to the spine is reduced, thereby increasing the acidity at the spine since acid can more easily travel to the spine. An increase of acidity at the spine reduces corrosion. In a conventional square or circular tube the distance from tubewall to spine is $d-S/2$ or $e-S/2$ where S is the thickness of the spine, d is the minimum dimension of the tube in one direction, and e is the minimum dimension of the tube in a perpendicular direction. In the present invention that distance is reduced by at least 10%, as indicated in FIG. 4 for example, where dimensions e and S are depicted.

Figure 3:
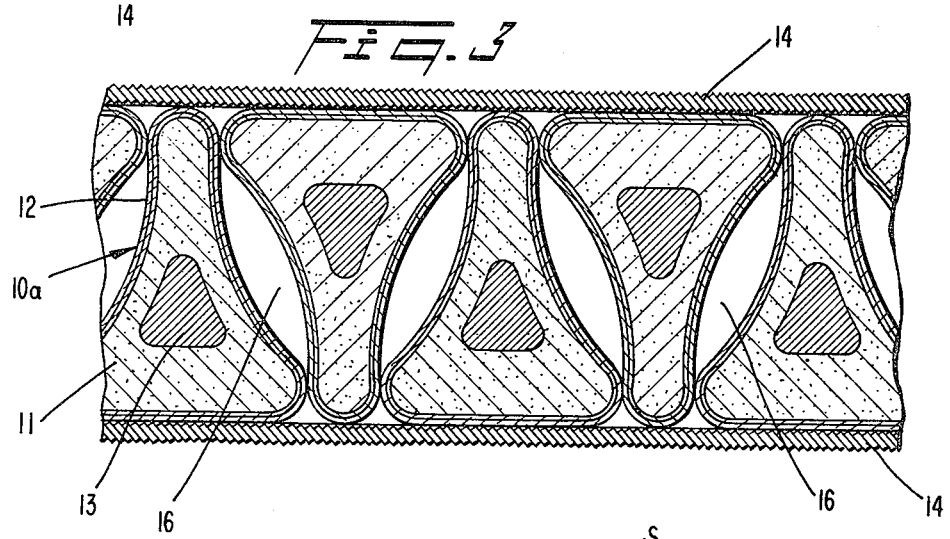
FIG. 3 is a view similar to FIG. 2 of another preferred tube shape.
Figure 4:
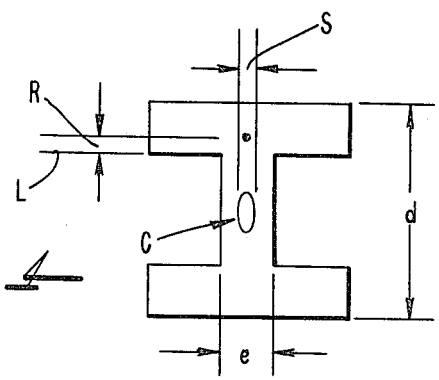
FIG. 4 is a schematic view of still another preferred tube shape.

In FIG. 3 there are depicted tubes 10a of T-shape, resulting in a larger number of tubes with even more surface-to-volume of active material. A space 16 remains between the tubes similar to that in FIGS. 1 and 2, so as to define an acid reservoir. Also in this case, concave sides of the tube form arches which can withstand pressure. In addition, pressure-absorbing elements can be inserted between the tubes, if desired. The spines 13 are recessed as shown on the drawing and have triangular shapes to conform to the shape of the tubes.

A simplified embodiment is shown in FIG. 5 wherein the tubes are essentially egg-shaped. The tubes are disposed at a distance from each other to provide an acid reservoir 21. It can be advantageous to arrange the spine 13A in a way so that the distance from the spine to a negative electrode is less than the distance between the tubes. As with other shapes, supporting elements, such as formed of plastic, can be placed between the tubes.

In addition, tubes with non-square rectangular shapes can be used according to the invention and this is shown in FIGS. 6 and 7. Such a rectangular shape is the simplest. In FIG. 6 supporting elements 23 and 24 are positioned between tubes 10e to provide an acid containing space between the tubes. These support elements can be made of thin polyester members. To prevent the acid from going directly to the negative plates from the area 25, the side of the area against the separator can be covered with a plastic film.

FIG. 7 shows an embodiment of non-square rectangular tubes where supports 26A are made of a porous volume-retaining material like porous PVC, porous polystyrene, impregnated Cellulose, porous polyester, porous olefines, glasswool or wood. This can be an integrated part of the separators 14.

In the described forms of the invention the surface of the tubes 10, 10a, etc., can be increased by making the wall corrugated or ribbed at least on the surface. The tubes 10, 10a, etc., can also be of the pasted type without a tube wall. It is essential for all forms according to the invention that the active material is shaped or arranged to give areas the volume of which amounts to 20% of the acid outside the electrodes and which works like an acid reservoir or funnel to avoid the starvation of acid for the positive active material which occurs in most known lead-acid batteries.

With reference now to FIGS. 8–18, a preferred manner of making electrode tubes according to the invention will be discussed.

With reference to FIG. 8, two fibrous masses 30A and 30B are fed from parallel supply rollers 32A and 32B to a pair of guide rollers 34A and 34B. The sheets may comprise felted or woven fibers of glass or plastic, such as polyester, propathene, or other acid-proof plastic, for example. The sheets are heated in a thermal unit 36 during the feeding process. Before the sheets pass between pressing rollers 38A, 38B, which are arranged at regular intervals across the width of the sheets, i.e., transversely of the longitudinal direction of travel, sheets 49A and 40B, made of plastic net, are conducted from supply rollers 42A and 42B and are applied against the outer sides of the sheets 30A, 30B.

The purpose of the net sheets 40A, 40B is to form an outer sheath portion of the tubes to provide strength and rigidity to the tube walls. This is necessary when sheets 30A, 30B do not possess sufficient strength or solidity, which is the case with a felted glass-fiber mat. Instead of a plastic net, plastic sheeting may be used which is highly perforated along its entire area.

The pressing rollers 38A, 38B are spaced at regular intervals corresponding to one-half the circumference of the finished tube. The width of each pressing roller corresponds to the width of a support flange that is to be formed between adjacent tubes as will become apparent. If the sheets 30A, 30B comprise woven or braided mats of thermoplastic material, as, for example, propathene, preheating of the sheets is achieved by the thermal unit 36, and additional heating then takes place in connection with pressing rollers 38A, 38B, such as by hot air, for example, until the softening or melting point of the thermoplastic material is reached. Thereupon, a fusion or welding together of the melting sheets 30A, 30B occurs in those vicinities where they are pressed together by the pressing rollers.

If glass or polyester is used in the formation of the sheets 30A, 30B, strips or tapes 44 of polyethylene or propathene are drawn from supply rollers 46 and are inserted between the sheets 30A, 30B. Under the influence of heat and pressure at the pressing rolls 38A, 38B, the strips 44 fuse into sheets 30A, 30B, thereby welding them together. During that step, the sheets 30A, 30B, which have been heated by the thermal until 36 to a temperature above the softening temperature for the plastic strips 44, conduct heat to the strips. Strips 44 may comprise netting or perforated foil. Normally, it is best to use such strips, so that the weld will exhibit the necessary rigidity. However, if the netting in the sheets 40A, 40B is sufficiently thick, the strips may be unnecessary. The netting is also caused to melt or fuse by heating it in the same way as with strips 44, as described above, whereby the thick plastic melts down through both of the sheets 30A, 30B and welds them together.

In order to heat the sheet sections 30A, 30B and the strips 44 (if such strips are employed) there can alternately be utilized radiation, the blowing on of hot gasses, ultrasound, or high frequency. The latter type of heating (dielectrical heating) is particularly suitable when the netting in sheets 40A, 40B and the strips 44 comprise polyolefins. Their straight molecule chains are not heated, but only the glass or plastic in the sheets 30A, 30B. In this manner, one can cause the netting and strips to fuse, without a change in volume, into sheets 30A, 30B by causing the netting and strips to be melted into, or fused with, the sheets 30A, 30B through the agency of the heat.

As the plastic net very often contains tensions or strains, it is important that sheets 30A, 30B be heated, rather than sheets 40A, 40B since the latter comprise netting. The plastic then melts into the sheeting. Therefore, netting that is extruded in two planes, as, for example, Netlon netting, is particularly suitable, as only one of the planes needs to be melted into the sheeting. This holds true for the surface of the pipe, where the pressing-in is carried out by means of cylinders or rollers, but not for the weld joint, where pressing is achieved by means of pressing rollers 38A in order to urge the netting in its entirety into the weld joint. The pressure must therefore be greater in the weld joint itself.

In FIG. 9 is shown the result obtained by means of the described procedure. Between the welded joints or stacks 48 are disposed flat tubes, which define flat channels 50, which channels are externally surrounded by an outer sheath 52 of netting.

A similar product can be obtained in connection with the process described if, instead of using two separate sheets 30A, 30B which are drawn from rollers 32A, 32B a single so-called cartridge-belt-woven sheet is conducted into the thermal unit 36. Such a cartridge sheet comprises a weave which includes woven sheet sections forming longitudinal flat channels separated by longitudinal woven "joints," i.e., so-called alternation or shift points comparable to the weld joints 48 of the product described in connection with FIG. 9. The flat channels are formed by upper and lower sections of the cartridge sheet, each of which correspond in width to one-half the desired circumference of a tube. The woven joints correspond in width to the desired dimension of support flanges between adjacent tubes as will be discussed hereinafter.

After the sheets 30A, 30B have been welded together, the flat channels 50 are passed longitudinally over and along stationary flat mandrels 53 (FIG. 9) which are situated between the welded joints, such that the mandrels enter the channels. If desired, the mandrels can be heated electrically in order to maintain the temperature of the sheets 30A, 30B. The flat mandrels can be connected to, or blend into, mandrels which have a shape corresponding to that of the finished tubes. In this fashion, the channels 50 will be enlarged whereby the overall width of the material is reduced, as shown in FIG. 10.

If the sheets 30A, 30B and/or 40A, 40B are made of thermoplast, as for example, polypropathene, possibly together with other fibers which do not need to be thermoplastic, then the forming can proceed very rapidly, so that the mandrels need to hold the final form over a length of only a few centimeters, whereby the heating of the sheets takes place before passage of the material over the mandrels and cooling of the sheets occurs during such passage. The rigid weld joints 48 can be used during this forming process to cause the walls of the tube to be pressed-in in order to obtain an I-shape as shown in FIG. 11, but outside molding tools can also be employed for this purpose. If it is only desired to form tubes individually, this can be effected by means of pressing rollers or the like. If the tubes are to be stabilized by means of impregnation with phenol or a similar material which requires hardening, the forming process must, of course, be extended over a longer period.

The mandrels and other molding tools which are utilized can be anchored mechanically downstream in the cource of the material's movement, so as not to interfere with entry of the mandrels into the tubes as shown in FIG. 2 as the material is advanced. Alternately, magnetic anchoring can be employed, whereby the heating of the material passing over the mandrels and tools can be carried out by "virkel" currents.

FIG. 11 depicts an electrode plate wherein the outer sheath 60 comprises the afore-described material whose tubes have been shaped to an I-configuration by being passed over I-shaped mandrels and then filled with lead and active material 62. The connector seams 48 form rigid support flanges between the tubes and serve as spacer elements therebetween.

Single tubes can be produced in the same way as afore-described, whereby a sheet 30A (or 30B) is folded over, as shown in FIG. 5. A seam 65, defined by the ends of the sheet is then formed as by welding. From a flat state, the sides 66, 68 of the channel are enlarged to the desired form according to FIG. 13 which shows a circular tube, or to the previously mentioned I-shape 70 according to FIG. 14.

Heretofore, the welding of tubes has been achieved by joint welding or lap welding. Since, as with continuous operation, heat can be applied only from the outside, the weld length becomes relatively long, perhaps up to 1.5 m. According to the present invention, butt welding can be employed, utilizing heat from two sides by means of the pressing rollers 14, whereby the plastic fuses into sheets 30A, 30B, whereby a rigid weld is obtained.

FIG. 15 shows a rectangular tube 79 which is produced according to the invention, and FIG. 16 shows several such tubes joined to form a tubular plate, where the weld joints form spacer elements 79A between the pipes.

Other geometric tube shapes can be produced according to the method of this invention. If, for example, one wishes to make a T-shaped tube according to FIG. 3, flat channels with joints or seams of the desired width can be made in the afore-described manner, and then formed with the aid of inner mandrels and outer molding tools, so that one obtains a tubular plate 81 according to FIG. 17. Also, single tubes can be formed and assembled together to form the tubular plate.

A further embodiment of the method according to the invention involves forming the tubes of pre-worked braided or woven stockings or hose of glass or plastic fibers, as shown in FIG. 18. The stockings 80 are fed from co-axial rollers 82, and then drawn on flat mandrels, with regular intervals between adjacent stockings. Nets 40A, 40B are placed against outer sides of the flat stockings, and those parts of the nets that bridge the intervals between the stockings are welded together in the previously described manner in order to form rigid flanges between the stockings. The flat channels between the strakes can then be widened to form tubes of the desired shape in the manner described above. Strips 44 of plastic may be placed across the intervals between the stockings in order to be fused into the welded joints, as shown.

It should be pointed out that the strakes or weld joints need not extend longitudinally. Rather, pressing members extending transversely relative to the direction of travel can be provided which intermittently contact the sheets to form weld joints.

In batteries of the sealed, pressurized type, mentioned earlier, the tube shape according to the present invention, and especially the I-shape, renders it possible to maintain pressure between the electrodes while employing a thin fibrous microporous separator. Ample electrolyte is supplied in that case via the passages between the tubes and can be supplied, if necessary through the open upper ends of such passages.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. An electrical accumulator of the sealed type comprising positive and negative electrode plates and a separator therebetween, said plates and separator being kept pressed together under pressure to force oxygen through the separator during charging for reaction with the negative plate, said positive plate comprising a row of immediately adjacent tubes formed of porous fibrous material having a shape such that the ratio of volume to surface area of active material is no greater than 0.20 times the thickness of the tube taken in a direction between the ends of the tube which face the negative electrodes, said separator having a thickness in said direction no greater than substantially 1 mm., the sides of said tubes being of concave configuration to define electrolyte-containing channels, wherein the total amount of electrolyte contained within said channels is at least 10% of the total electrolyte within the accumulator, with substantially all of the electrolyte which reacts with said positive electrode having to pass through said concave sides, said tubes including substantially straight end walls which are joined by said concave sides and which are pressed against said separators.

2. An accumulator according to claim 1, wherein said concave sides are self-supporting and are exclusive of braces extending therebetween.

* * * * *